(12) United States Patent
Kobayashi et al.

(10) Patent No.: US 9,409,488 B2
(45) Date of Patent: Aug. 9, 2016

(54) IN-VEHICLE CHARGING APPARATUS THAT CHARGES A STORAGE BATTERY INSTALLED IN A VEHICLE FROM A POWER SUPPLY PROVIDED OUTSIDE THE VEHICLE

(75) Inventors: Norihiko Kobayashi, Tokyo (JP); Tomonori Nonaka, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 474 days.

(21) Appl. No.: 14/007,735

(22) PCT Filed: Mar. 27, 2012

(86) PCT No.: PCT/JP2012/002109
§ 371 (c)(1),
(2), (4) Date: Sep. 26, 2013

(87) PCT Pub. No.: WO2012/132405
PCT Pub. Date: Oct. 4, 2012

(65) Prior Publication Data
US 2014/0015494 A1 Jan. 16, 2014

(30) Foreign Application Priority Data
Mar. 29, 2011 (JP) .................. 2011-072050

(51) Int. Cl.
*H01M 10/46* (2006.01)
*B60L 11/18* (2006.01)
(Continued)

(52) U.S. Cl.
CPC ............ *B60L 11/1816* (2013.01); *B60L 1/003* (2013.01); *B60L 3/0069* (2013.01); *B60L 3/04* (2013.01);
(Continued)

(58) Field of Classification Search
CPC ..... H02J 7/0004; H02J 7/0008; H02J 7/0011; H02J 7/0029; H02J 7/0026; H02J 7/0031
USPC ........................ 320/104, 107, 109, 114, 132
See application file for complete search history.

(56) References Cited

U.S. PATENT DOCUMENTS 5,272,431 A 12/1993 Nee
8,215,963 B2 * 7/2012 Ichikawa .............. B60L 11/123
439/490

(Continued)

FOREIGN PATENT DOCUMENTS

EP 1992524 A1 11/2008
JP 11-110689 A 4/1999
(Continued)

OTHER PUBLICATIONS le;.4qInternational Search Report for PCT/JP2012/002109 dated Jul. 10, 2012.
(Continued)

*Primary Examiner* — Edward Tso
(74) *Attorney, Agent, or Firm* — Pearne & Gordon LLP

(57) ABSTRACT

An in-vehicle charging device is provided with: a recording unit (27) that accumulates vehicle information regarding a vehicle; a vehicle-side PLC communication control unit (26) that, when it is determined to be necessary to transmit vehicle information accumulated at the recording unit (27) to the outside of the vehicle, commands transmission of a control signal for closing an earth leakage circuit breaker (not shown in figure); and a charging control unit (25b) that transmits a control signal to the earth leakage circuit breaker on the basis of the command from the vehicle-side PLC communication control unit (26). When electrical energy is not being supplied to a storage battery (24), the vehicle-side PLC communication control unit (26) establishes PLC and batch transmits vehicle information when the earth leakage circuit breaker has been closed by the control signal transmitted from the charging control unit (25b).

14 Claims, 12 Drawing Sheets

(51) Int. Cl.
- *B60L 3/00* (2006.01)
- *B60L 3/04* (2006.01)
- *H02J 7/00* (2006.01)
- *H02J 13/00* (2006.01)
- *H01M 10/44* (2006.01)
- *B60L 1/00* (2006.01)

(52) U.S. Cl.
CPC ......... *B60L 11/1818* (2013.01); *B60L 11/1846* (2013.01); *H01M 10/44* (2013.01); *H02J 7/0004* (2013.01); *H02J 7/0031* (2013.01); *H02J 13/0024* (2013.01); *B60L 2210/30* (2013.01); *B60L 2230/12* (2013.01); *B60L 2240/34* (2013.01); *B60L 2240/36* (2013.01); *B60L 2270/145* (2013.01); *H01M 2220/20* (2013.01); *Y02B 90/2623* (2013.01); *Y02T 10/7005* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01); *Y04S 40/122* (2013.01)

(56) References Cited

U.S. PATENT DOCUMENTS

| | | |
|---|---|---|
| 2009/0306841 A1 | 12/2009 | Miwa et al. |
| 2010/0145568 A1 | 6/2010 | Watanabe |
| 2011/0022222 A1 | 1/2011 | Tonegawa |
| 2013/0119947 A1* | 5/2013 | Ishida ............... B60L 3/0046 320/162 |
| 2013/0207608 A1* | 8/2013 | Kawashima ........ H01M 10/44 320/109 |
| 2014/0300492 A1* | 10/2014 | Watanabe ............. G08B 13/00 340/901 |

FOREIGN PATENT DOCUMENTS

| | | |
|---|---|---|
| JP | 2009-165301 A | 7/2009 |
| JP | 2009-303456 A | 12/2009 |
| JP | 2010-004674 A | 1/2010 |
| JP | 2010-110101 A | 5/2010 |
| JP | 2010-142001 A | 6/2010 |
| JP | 2010-166768 A | 7/2010 |
| JP | 2011-010399 A | 1/2011 |
| JP | 2011-015530 A | 1/2011 |
| JP | 2011-035975 A | 2/2011 |
| JP | 2011-151717 A | 8/2011 |
| JP | 2011-172363 A | 9/2011 |
| WO | 2008/143311 A1 | 11/2008 |
| WO | 2009/090813 A1 | 7/2009 |

OTHER PUBLICATIONS

Supplementary European Search Report for Application No. 12762866.7-1807/2692570 PCT/JP2012002109, Dated Oct. 20, 2015.

* cited by examiner

TABLE A (CASE WHERE COMMAND AND VEHICLE INFORMATION HAVE ONE-TO-ONE CORRESPONDENCE RELATION)

| COMMAND | PRIORITY LEVEL | PRIORITY LEVEL COEFFICIENT | VEHICLE INFORMATION | DATA SIZE EXAMPLE | EVALUATION VALUE |
|---|---|---|---|---|---|
| 01 | 5 | 1000 | BREAKDOWN DETECTION | 16byte | 16,000 |
| 02 | 5 | 1000 | BATTERY ELECTRIC LEAKAGE DETECTION | 16byte | 16,000 |
| 03 | 5 | 1000 | USER-INITIATED COMMUNICATION REQUEST | 16byte | 16,000 |
| 04 | 5 | 100 | SENSOR CAMERA IMAGE (URGENT) | 40000byte | 4,000,000 |
| 05 | 4 | 10 | VEHICLE INDOOR TEMPERATURE ABNORMALITY | 16byte | 160 |
| 06 | 4 | 100 | CHARGING RATE REDUCTION | 16byte | 1,600 |
| 07 | 3 | 100 | SENSOR VIBRATION DETECTION | 16byte | 1,600 |
| 08 | 2 | 0.1 | CAR MAINTENANCE INFORMATION | 20000byte | 2,000 |
| 09 | 1 | 0.0001 | SENSOR CAMERA IMAGE (REGULAR) | 40000byte | 40 |
| 10 | 1 | 0.01 | RUNNING HISTORY (REGULAR TRANSMISSION TO SERVER) | 20000byte | 200 |

FIG. 9

TABLE B: CASE WHERE COMMANDS AND GENRES (CONTENT OF EACH TYPE) CORRESPOND TO EACH OTHER

| COMMAND FOR EACH TYPE | CONTENT OF EACH TYPE | TYPE |
|---|---|---|
| 01 | URGENCY | VIBRATION DETECTION, ELECTRIC LEAKAGE DETECTION, SENSOR CAMERA IMAGE (URGENT) |
| 02 | MAINTENANCE | VEHICLE MAINTENANCE INFORMATION |
| 03 | WARNING | CHARGING RATE REDUCTION, TEMPERATURE ABNORMALITY, VIBRATION DETECTION |
| 04 | USER | USER'S COMMUNICATION REQUEST |
| 05 | REGULAR TRANSMISSION | RUNNING HISTORY, SENSOR CAMERA IMAGE (REGULAR) |

FIG. 10

IN-VEHICLE CHARGING APPARATUS THAT CHARGES A STORAGE BATTERY INSTALLED IN A VEHICLE FROM A POWER SUPPLY PROVIDED OUTSIDE THE VEHICLE

TECHNICAL FIELD

The present invention relates to an in-vehicle charging apparatus to be installed in a vehicle and supplies power for charging a storage battery installed in the vehicle, through a power line extending from an external power supply via an earth leakage circuit-breaker. More particularly, the invention relates to an in-vehicle charging apparatus capable of using the power line as a communication line.

BACKGROUND ART

In recent years, hybrid electric vehicles (HEVs) and electric vehicles (EVs) have been generalized to some degree, and charging facilities for charging storage batteries installed in such vehicles are widely used along with the generalization of such vehicles. In this regard, as a related art, there has been disclosed a technique which turns On/Off a main relay of a charging cable (power line) using a control pilot line (CPLT line; communication control line) in order to control charging a storage battery installed in a vehicle (for example, see Patent Literature (hereinafter, abbreviated as PTL) 1). According to this technique, turning on the main relay of the charging cable in a time slot for which electric power charge is low, based on power information acquired from an external power supply of a vehicle through the CPLT line allows a storage battery of the vehicle to be appropriately charged while keeping the cost required for charging low. Note that, although a charging process flow using the CPLT line is defined in ISO/IEC 61851 standard and SAE J1772 standard, which are joint connect standards of EVs and HEVs, a description thereof will be omitted herein.

In addition, as another related art, a technique that monitors the state of charge of a storage battery installed in a vehicle using power line communication (PLC) which uses a power line as a communication line has been disclosed (for example, see PTL 2). According to this technique, before the storage battery installed in the vehicle is charged, a communication connection using a power line with a vehicle ID, i.e., PLC is established. Then, disconnection of a charging cable (power line) or the like occurs during a charging process, a cable disconnection detection signal indicating disconnection of a changing cable during the charging process, monitoring information indicating the state of the vehicle, and the vehicle ID are transmitted from a charging control apparatus of the vehicle to an external charging station through communication (PLC) using the charging cable. Accordingly, when disconnection of a charging cable (power line) occurs during a charging process in an environment in which a plurality of vehicles are charged at a single charging station, a vehicle and a state in which the disconnection of the charging cable occurs can be instantly monitored and determined on the charging station side. As described above, the establishment of communication connections using PLC which transmits information signals while superimposing one on top of another in an overlapping manner between the vehicle and subscriber equipment (charging station) through an infrastructure facility (in other words, the power line) enables charging control while the storage battery installed in the vehicle is appropriately monitored.

CITATION LIST

Patent Literature

PTL 1
Japanese Patent Application Laid-Open No. 2010-004674
PTL 2
Japanese Patent Application Laid-Open No. 2011-010399

SUMMARY OF INVENTION

Technical Problem

However, according to the technique disclosed in PTL 1 described above, when the storage battery installed in the vehicle is fully charged, a relay contact of a main circuit of an electric vehicle supply equipment (EVSE; equipment (in other words, the earth leakage circuit-breaker on the power supply side) connecting an external power supply and the vehicle) is open in accordance with a control signal flowing through the CPLT line. Accordingly, since a vehicle-side connection terminal of the power line (charging cable) supplied from the infrastructure side (power supply side) to the vehicle side is in a non-voltage state, the vehicle is electrically safe even when the vehicle-side connection terminal of the power line is separated from the vehicle. However, in this case, the power line connecting the power supply side and the vehicle side is physically cut off due to the relay contact of the main circuit of the EVSE, so that even when the vehicle-side connection terminal of the power line is connected to the vehicle, communication through PLC cannot be performed between an in-vehicle charging apparatus installed in the vehicle and the external power supply (subscriber equipment). In other words, no vehicle information can be transmitted from the vehicle side.

In addition, according to the technique disclosed in PTL 2 described above, upon completion of charging of the storage battery installed in the vehicle, a relay contact of the earth leakage circuit-breaker disposed between the vehicle-side in-vehicle charging apparatus and the external charging station is open, so that the power line (charging cable) between the in-vehicle charging apparatus and the external charging station is physically cut off. Accordingly, no vehicle information can be transmitted from the vehicle side.

An object of the present invention is to provide an in-vehicle charging apparatus capable of transmitting vehicle information from a vehicle side using power line communication even when an earth leakage circuit-breaker is turned off.

Solution to Problem

According to an aspect of the present invention, there is provided an in-vehicle charging apparatus that charges a storage battery installed in a vehicle from a power supply provided outside the vehicle through a power line extending via an earth leakage circuit-breaker, the apparatus including: a storage section that stores vehicle information relating to the vehicle; and a vehicle-side PLC communication control section that outputs a control signal for closing the earth leakage circuit-breaker, then establish a PLC communication line using the power line as a communication line, and transmits the vehicle information stored in the storage section to the outside of the vehicle, when determining that the vehicle information stored in the storage section needs to be transmitted to the outside of the vehicle.

Advantageous Effects of Invention

According to the present invention, when no electrical energy is supplied to a storage battery due to opening of an earth leakage circuit-breaker connected to a power line, in other words, when a storage battery is not charged, a PLC communication connection is established by closing the earth leakage circuit-breaker only at necessary timing, and vehicle information stored in a storage section of an in-vehicle charging apparatus is thereby transmitted to the outside. Accordingly, when the storage battery is not charged, the earth leakage circuit-breaker is open in a time slot other than a time slot in which the vehicle information is instantly transmitted through a PLC communication connection. Thus, a vehicle-side connection terminal of the power line is in a non-voltage state because the earth leakage circuit-breaker is open, whereby electrical safety is ensured. In addition, the condition for transmission timing of the vehicle information is any one of a condition for transmitting vehicle information having a predetermined size or greater altogether, a condition for transmitting vehicle information altogether in a case where vehicle information having a high priority level is detected, and a condition for transmitting vehicle information altogether in a case where an evaluation value acquired by "priority level coefficient×data size" is a predetermined value or greater.

BRIEF DESCRIPTION OF DRAWINGS

FIG. 9 is a diagram illustrating Table A in which a priority level, a priority level coefficient, a data size example, and an evaluation value for vehicle information are compared with each other;

FIG. 10 is a diagram illustrating Table B in which a command for each type and a content of each type of vehicle information are compared with each other;

DESCRIPTION OF EMBODIMENTS

An in-vehicle charging apparatus according to an embodiment of the present invention decreases the number of times of turning on the relay contact of a main circuit of an earth leakage circuit-breaker (EVSE) interposed in a power line (charging cable) connecting an external power supply (in-house equipment) and the in-vehicle charging apparatus to each other as much as possible and keep the turning-on time short. Accordingly, the time during which the relay contact of the main circuit of the EVSE is turned off can be long whereby electrical safety of a vehicle-side connection terminal of the power line can be ensured. In other words, the relay contact of the main circuit of the EVSE is turned on only at the time when the connection of the power line supplying charged power (electrical energy) from the external power supply to the in-vehicle charging apparatus is necessary and only in a time slot in which an information signal (vehicle information) is transmitted and received through PLC between the external power supply and the in-vehicle charging apparatus during the stop of the charging power. Therefore, electrical safety of the vehicle-side connection terminal of the power line can be ensured.

Stated differently, when the relay contact of the main circuit of the EVSE is turned off during a reservation for charging an in-vehicle storage battery or after the completion of charging, one of the following determines is made in accordance with a desired content for transmitting an information signal to the in-house equipment side including the external power supply from the in-vehicle charging apparatus side. In other words, it is determined whether to transmit an information signal from the in-vehicle charging apparatus to the in-house equipment side using PLC by immediately turning on the relay contact of the main circuit of the EVSE or to transmit an information signal from the in-vehicle charging apparatus to the in-house equipment side using PLC by turning on the relay contact after a predetermined amount of data is stored on the in-vehicle charging apparatus side. Accordingly, the number of times of turning on the relay contact of the main circuit of the EVSE an d the turning-on time of the relay contact can be minimized, whereby electrical safety of the vehicle-side connection terminal of the power line can be ensured.

Hereinafter, in-vehicle charging apparatuses according to several embodiments of the present invention will be described in detail with reference to the drawings. In the all the drawings for describing the following embodiments, generally, the same reference signs are assigned to the same elements, and any redundant description thereof will be omitted as much as possible.

Embodiment 1

Figure 1:
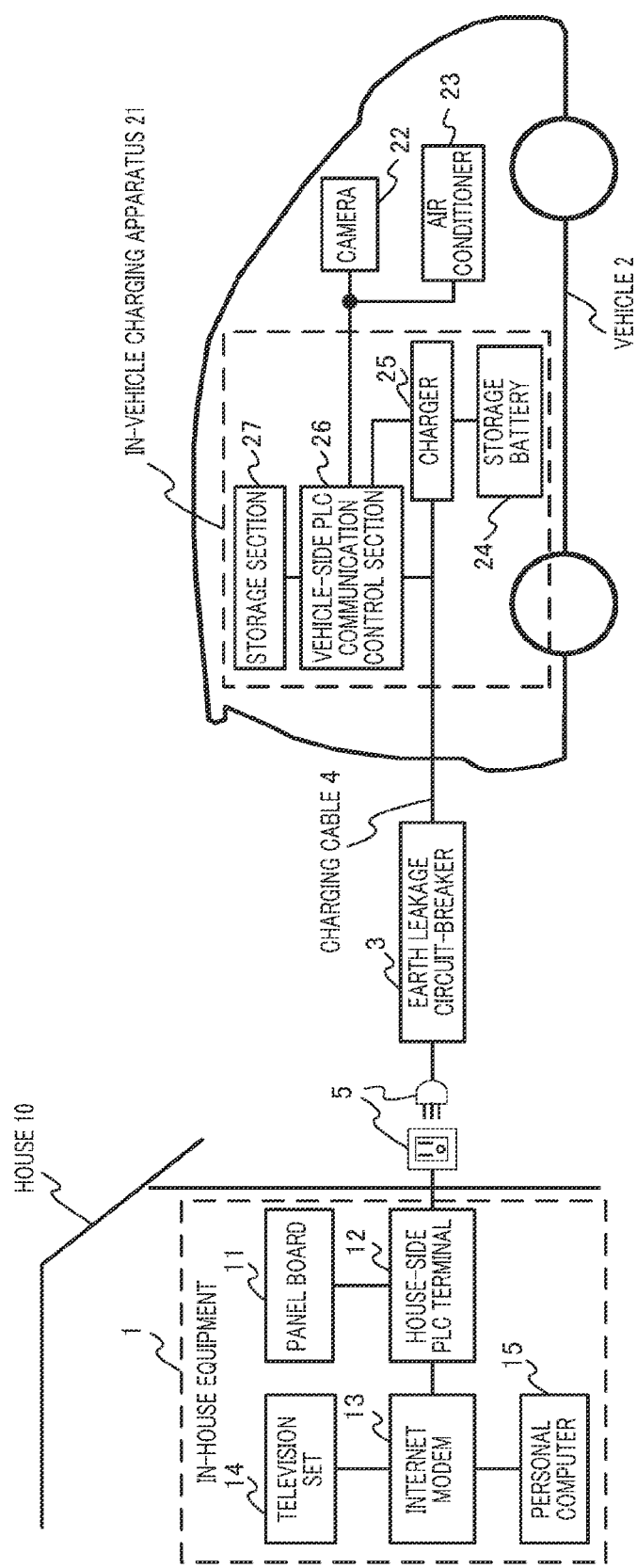
FIG. 1 is a configuration diagram of a system for realizing an in-vehicle charging apparatus according to an embodiment of the present invention.

FIG. 1 is a configuration diagram of a system for realizing an in-vehicle charging apparatus according to an embodiment of the present invention. As illustrated in FIG. 1, in-house equipment 1 of house 10 and in-vehicle charging apparatus 21 of vehicle 2 are connected to each other using charging cable (power line) 4 via earth leakage circuit-breaker (EVSE) 3. One end of charging cable 4, for example, is connected to in-house equipment 1 using plug/outlet 5 having three polarities configured by single-phase AC of AC 100 V and an earth line. In addition, the other end of charging cable 4, although not particularly illustrated in the figure, is connected to a vehicle-side connection terminal having three polarities through a connection terminal, which includes a CPLT line terminal, having four polarities so as to be connected to in-vehicle charging apparatus 21 of vehicle 2.

There are a case where earth leakage circuit-breaker 3 is directly connected to charging cable 4 and a case where earth leakage circuit-breaker 3 is attached to a charging pole installed in advance. In any of the cases, plug/outlet 5 side of charging cable 4 including earth leakage circuit-breaker 3 is included in the infrastructure facility.

In-house equipment 1 includes panel board 11, house-side PLC terminal 12, internet modem 13, television set 14, and personal computer (PC) 15. Panel board 11 takes power from an outdoor power pole and branches power lines inside the house 10. House-side PLC terminal 12 is connected to the power line branched from panel board 11 and controls the supply of charging power to vehicle 2 side or establishes PLC between vehicle 2 side and the in-house equipment side. Internet modem 13 is connected to house-side PLC terminal 12 and transmits/receives information signals (vehicle information) according to the PLC. Television set 14 and PC 15 are connected to internet modem 13.

Vehicle 2 includes: in-vehicle charging apparatus 21 that receives charging power transmitted from house-side PLC terminal 12 through charging cable 4 and controls charging of vehicle 2; camera 22; and air conditioner 23, for example. In addition, in-vehicle charging apparatus 21 includes storage battery 24, charger 25, vehicle-side PLC communication control section 26, storage section 27, and the like, and such elements will be described later in detail. Here, a general driving apparatus for running vehicle 2 and/or the like do not directly relate to the present invention, so that the illustration thereof is omitted. In addition, while the above-described vehicle-side connection terminal having four polarities used for connecting charging cable 4 to in-vehicle charging apparatus 21 is disposed at a predetermined position of a body of vehicle 2, the illustration of the vehicle-side connection terminal is omitted.

Figure 2:
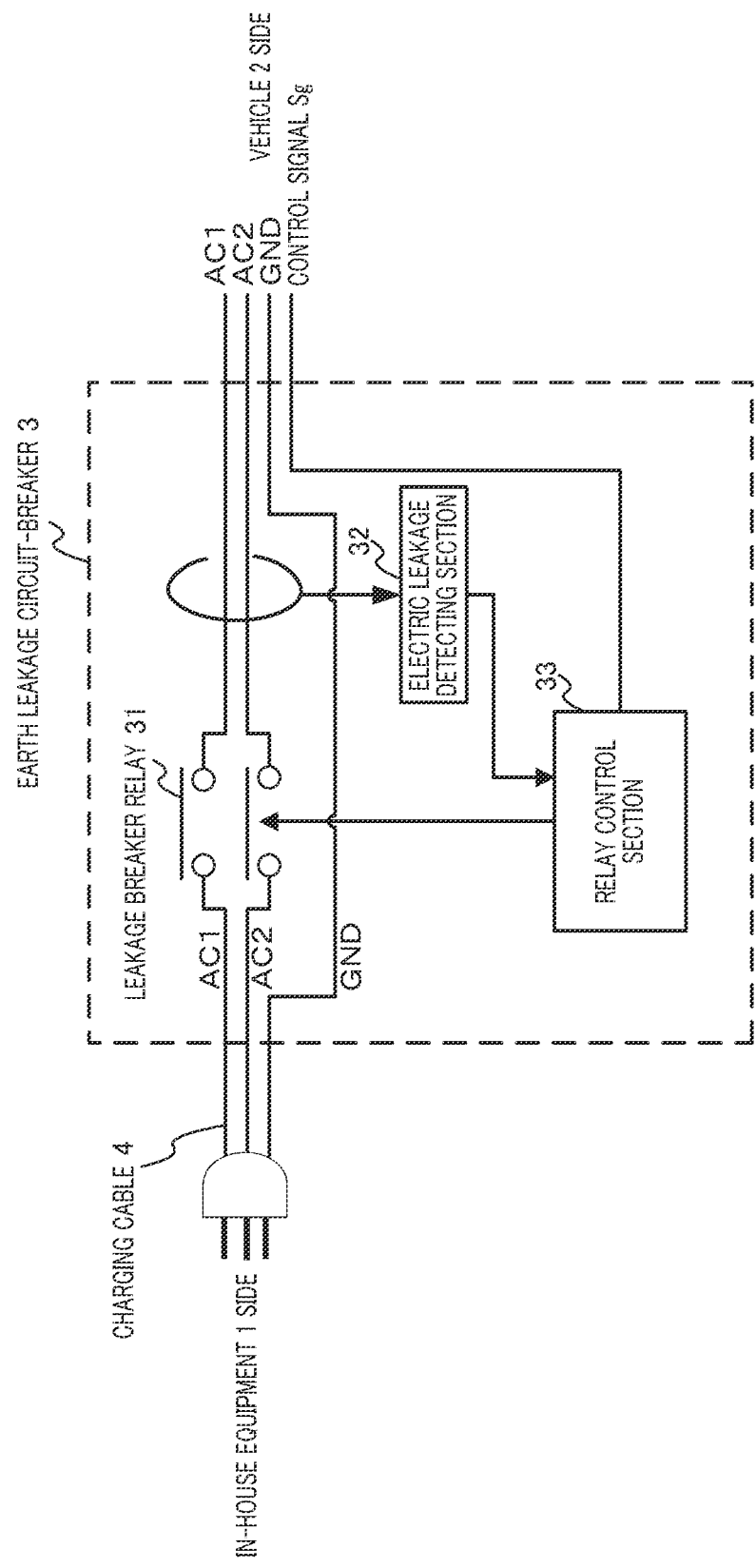
FIG. 2 is a detailed circuit configuration diagram of an earth leakage circuit-breaker illustrated in FIG. 1.

FIG. 2 is a detailed circuit configuration diagram of earth leakage circuit-breaker 3 illustrated in FIG. 1. As illustrated in FIG. 2, earth leakage circuit-breaker 3 receives two single-phase AC lines (AC1 and AC2) and one ground line (GND) of charging cable 4 on in-house equipment 1 side and inputs two single-phase AC lines (AC1 and AC2) and one ground line (GND) to vehicle 2 side through contacts of leakage breaker relay 31 of earth leakage circuit-breaker 3 interposed between two single-phase AC lines (AC1 and AC2). Such a configuration is the same as that of a generally used earth leakage circuit-breaker, so that a detailed description thereof will be omitted.

In an embodiment of the present invention, earth leakage circuit-breaker 3 further includes electric leakage detecting section 32 and relay control section 33. Electric leakage detecting section 32 detects a change in a magnetic field of a coil changing in accordance with the occurrence of an electric leakage on power lines AC1 and AC2. Relay control section 33 receives an electric leakage detecting signal detected by electric leakage detecting section 32 and a control signal Sg transmitted form vehicle 2 and controls On/Off of the contact of leakage breaker relay 31.

Upon detection of an electric leakage by electric leakage detecting section 32, relay control section 33 turns off the contact of leakage breaker relay 31 regardless whether the control signal Sg is present on vehicle 2 side. In addition, in a case where a control signal Sg transmitted from vehicle 2 side represents an instruction for turning on the contact of leakage breaker relay 31 while an electric leakage is detected by electric leakage detecting section 32, relay control section 33 performs control such that the contact of leakage breaker relay 31 is turned on at a moment and then is immediately turned off. In other words, when a leakage current is detected by electric leakage detecting section 32, necessary vehicle information of vehicle 2 side is transmitted to in-house equipment 1 side during a momentary On period of leakage breaker relay 31, and leakage breaker relay 31 is immediately turned off after the transmission of the vehicle information. Accordingly, a non-voltage state of the vehicle-side connection terminal of charging cable 4 is maintained as long as possible, whereby electrical safety is ensured.

Figure 3:
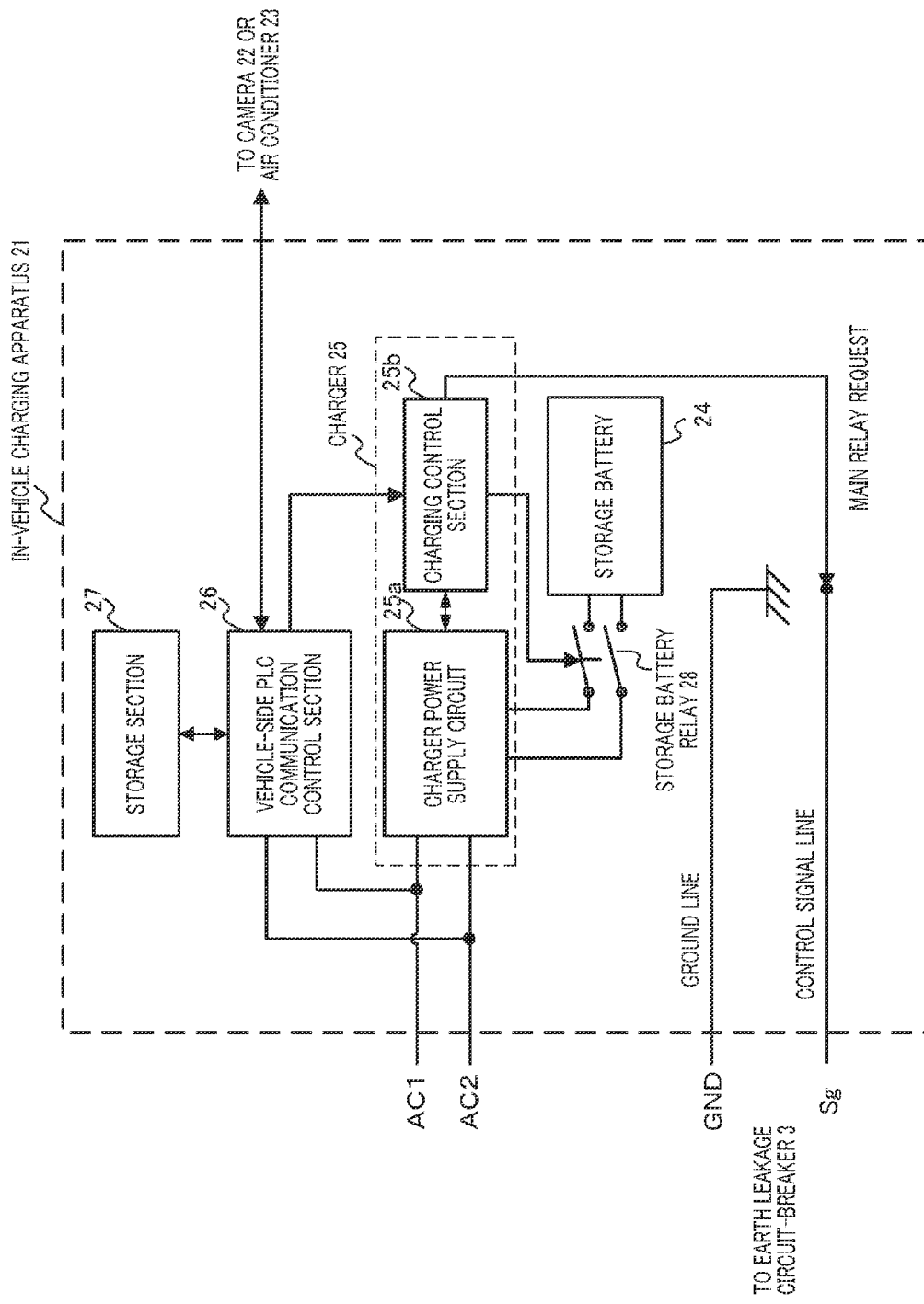
FIG. 3 is a block diagram illustrating a detailed configuration of the in-vehicle charging apparatus illustrated in FIG. 1.

FIG. 3 is a block diagram illustrating a detailed configuration of in-vehicle charging apparatus 21 illustrated in FIG. 1. As illustrated in FIG. 3, in-vehicle charging apparatus 21 includes storage battery 24, charger 25, vehicle-side PLC communication control section 26, storage section 27, and storage battery relay 28. Storage battery 24 supplies power for driving an electric motor (not illustrated in the figure) of vehicle 2 illustrated in FIG. 1. Charger 25 receives AC charging power transmitted from in-house equipment 1 illustrated in FIG. 1 through charging cable 4, converts the AC power into DC power, and charges storage battery 24. Vehicle-side PLC communication control section 26 establishes PLC upon transmission of an information signal (vehicle information) of vehicle 2 side to in-house equipment 1 through charging cable 4. Storage section 27 stores various kinds of vehicle information of vehicle 2 side. Storage battery relay 28 opens or closes the main circuit of storage battery 24.

In addition, charger 25 includes charger power supply circuit 25a that receives power of single-phase AC (AC1 and AC2) from earth leakage circuit-breaker 3 side illustrated in FIG. 2, converts the AC power into DC power, and charges storage battery 24 and charging control section 25b that detects the completion of preparation of storage battery 24 and charger power supply circuit 25a for charging and transmits a control signal Sg to relay control section 33 of earth leakage circuit-breaker 3. In addition, the single-phase AC lines (AC1 and AC2) and the ground line (GND) of charging cable 4 are inputted to in-vehicle charging apparatus 21.

Figure 4:
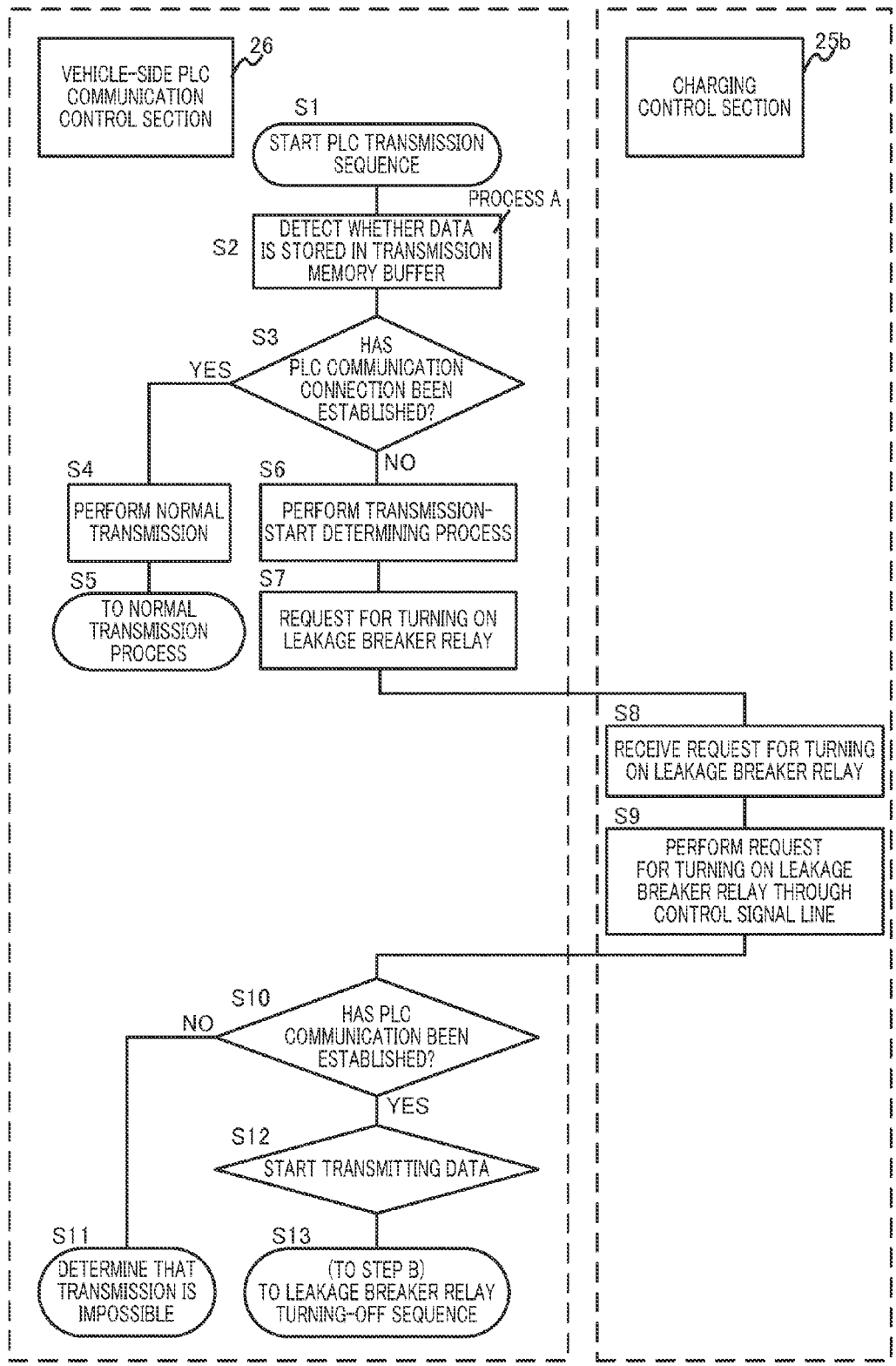
FIG. 4 is a flowchart illustrating the flow of a PLC process mainly determined and performed by a vehicle-side PLC communication control section of the in-vehicle charging apparatus according to Embodiment 1 of the present invention.

Next, the operation of the in-vehicle charging apparatus according to Embodiment 1 of the present invention will be described with reference to a flowchart. First, a flow of a case where a PLC process is mainly determined and performed by vehicle-side PLC communication control section 26 of in-vehicle charging apparatus 21 will be described. FIG. 4 is a flowchart illustrating the flow of a PLC process mainly determined and performed by vehicle-side PLC communication control section 26 of in-vehicle charging apparatus 21 according to Embodiment 1 of the present invention. In other words, this flowchart illustrates a flow of the process that is performed between vehicle-side PLC communication control section 26 of in-vehicle charging apparatus 21 illustrated in FIG. 3 and charging control section 25b of charger 25 and a process in which the vehicle information (data) of vehicle 2 is transmitted to in-house equipment 1 based on a determination mainly made by vehicle-side PLC communication control section 26.

As illustrated in FIG. 4, first, when a PLC transmission sequence for transmitting vehicle information of vehicle 2 to in-house equipment 1 side using charging cable 4 is started (Step S1), vehicle-side PLC communication control section 26 detects the volume of the vehicle information stored in storage section 27 in a transmission memory buffer (Step S2).

Then, vehicle-side PLC communication control section 26 determines whether or not a PLC communication connection (communication line) between vehicle 2 and in-house equipment 1 (house-side PLC terminal 12) has been established using charging cable 4 (Step S3).

Here, in a case where a PLC communication connection between vehicle 2 and in-house equipment 1 has been established (Yes in Step S3), the state is a normal charged state. Accordingly, vehicle-side PLC communication control section 26, for example, exchanges a regular PLC packet between vehicle 2 and in-house equipment 1 or detects a voltage of the AC line of charging cable 4. In this way, vehicle-side PLC communication control section 26 starts normal transmission for transmitting vehicle information (data) of vehicle 2 to in-house equipment 1 while continuously detecting whether or not the communication connection between vehicle 2 and in-house equipment 1 is normal (Step S4). Then, vehicle-side PLC communication control section 26 performs a normal transmission process for a regular packet according to PLC while continuing to charge storage battery 24 (Step S5).

On the other hand, in a case where a PLC communication connection between vehicle 2 and in-house equipment 1 has not been established in Step S3 (No in Step S3), vehicle-side PLC communication control section 26 performs a transmission-start determining process (Step S6). Here, the transmission-start determining process is a process of determining a condition (form) in which the vehicle information of vehicle 2 is transmitted to in-house equipment 1 so as to establish a PLC communication connection by turning on leakage breaker relay 31 of earth leakage circuit-breaker 3 only when the vehicle information is transmitted. In addition, the transmission-start determining process for the vehicle information is a process in which a transmission start time point is determined based on the condition (form) of the vehicle information. As examples of this process, there are a process in which vehicle information is transmitted when the capacity of the transmission memory buffer of the vehicle information stored in storage section 27 of in-vehicle charging apparatus 21 is full, a process in which vehicle information having a high priority level is transmitted, and a process in which vehicle information having a large evaluation value determined by priority level×data size is transmitted. The transmission-start determining process will be described later in detail.

Referring back to FIG. 4, when the transmission-start determining process is performed in Step S6, vehicle-side PLC communication control section 26 requests charging control section 25b of charger 25 to turn on leakage breaker relay 31 of earth leakage circuit-breaker 3 illustrated in FIG. 2 (Step S7). Then, charging control section 25b receives the request for turning on leakage breaker relay 31 (Step S8) and performs the request for turning on leakage breaker relay 31 by transmitting turning-on information of leakage breaker relay 31 to earth leakage circuit-breaker 3 as a control signal Sg through a control signal line (Step S9)

In this manner, vehicle-side PLC communication control section 26 determines whether a PLC communication connection has been established (Step S10). Then, in a case where a PLC communication connection has not been established (No in Step S10), vehicle-side PLC communication control section 26 determines that there is an abnormality in a certain portion of charging cable 4 and determines that transmission is impossible (Step S11). On the other hand, in a case where a PLC communication connection has been established in Step S10 (Yes in Step S10), vehicle-side PLC communication control section 26 starts the process of transmitting the vehicle information (data) of vehicle 2 to in-house equipment 1 (Step S12), and the process proceeds to a sequence (Step B) of turning off leakage breaker relay 31 to be described later when the transmission of predetermined vehicle information (data) is completed (Step S13).

Embodiment 2

Figure 5:
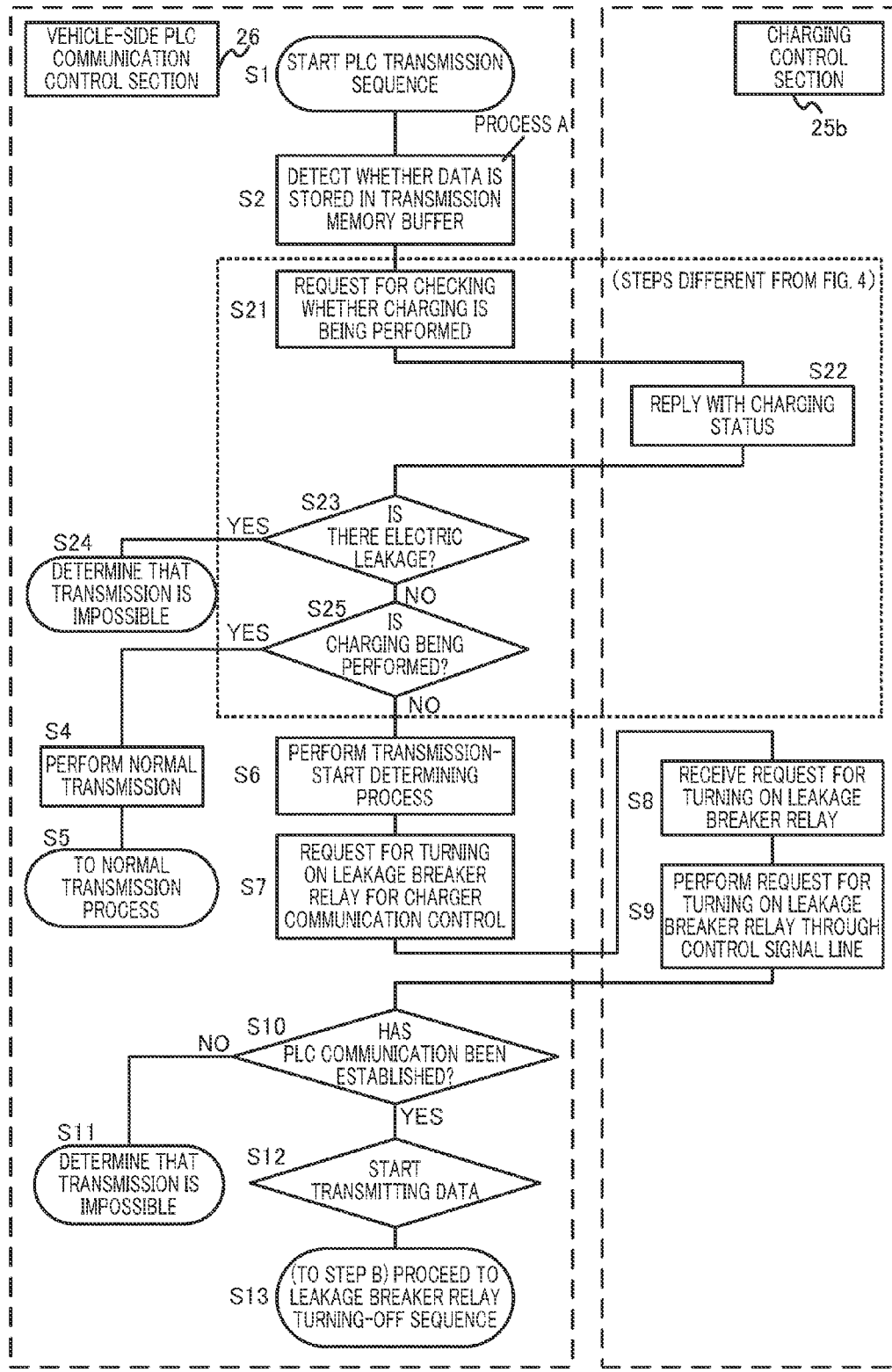
FIG. 5 is a flowchart illustrating the flow of a PLC process mainly determined and performed by a charging control section of a charger according to Embodiment 2 of the present invention.

Next, the operation of an in-vehicle charging apparatus according to Embodiment 2 of the present invention will be described with reference to a flowchart. In Embodiment 2, the flow of a case where a PLC process is mainly determined and performed by charging control section 25b of charger 25 will be described. FIG. 5 is a flowchart illustrating the flow of a PLC process mainly determined and performed by charging control section 25b of charger 25 according to Embodiment 2 of the present invention. In other words, this flowchart illustrates a flow of the process that is performed between vehicle-side PLC communication control section 26 of in-vehicle charging apparatus 21 illustrated in FIG. 3 and charging control section 25b of charger 25 and a process in which the vehicle information (data) of vehicle 2 is transmitted to in-house equipment 1 based on a determination mainly made by charging control section 25b of charger 25.

In the flowchart illustrated in FIG. 5, the same reference signs are assigned to the same steps as those of the flowchart illustrated in FIG. 4, and new reference signs are assigned to different steps represented as a portion surrounded by broken lines. Here, in describing the flow of the flowchart illustrated in FIG. 5, if a description is provided for only steps (steps of the portion surrounded by the broken lines) different from those illustrated in FIG. 4, it is difficult to understand the flow of the whole process. Thus, the steps used in both FIGS. 4 and 5 will also be sequentially described along the flow of the process.

As illustrated in FIG. 5, first, when a PLC transmission sequence for transmitting vehicle information of vehicle 2 to in-house equipment 1 side using charging cable 4 is started (Step S1), vehicle-side PLC communication control section 26 detects the volume of the vehicle information stored in storage section 27 in a transmission memory buffer (Step S2).

Next, vehicle-side PLC communication control section 26 requests charging control section 25b to check whether or not charger 25 of in-vehicle charging apparatus 21 is in the middle of a charging process (Step S21). Then, charging control section 25b of charger 25 replies to vehicle-side PLC communication control section 26 with a charging status (Step S22).

Accordingly, vehicle-side PLC communication control section 26 determines whether or not a leakage occurs during the charging process based on detection information acquired by electric leakage detecting section 32 of earth leakage circuit-breaker 3 (Step S23). Here, when an electric leakage occurs in charging cable 4 (Yes in Step S23), vehicle-side PLC communication control section 26 determines that the transmission of vehicle information (data) cannot be performed (Step S24) and ends the transmission process. In other words, when an electric leakage occurs in charging cable 4, the vehicle information (data) transmission process is immediately completed without turning on leakage breaker relay 31.

On the other hand, when no electric leakage occurs in charging cable 4 in Step S23 (No in Step S23), vehicle-side PLC communication control section 26 determines whether or not a charging process using charging cable 4 is in the middle of the process (Step S25). Here, in a case where the charging process is currently in the middle of the process (Yes in Step S25), a PLC communication connection between vehicle 2 and in-house equipment 1 has already been established. Accordingly, vehicle-side PLC communication control section 26 starts normal transmission for transmitting vehicle information (data) of vehicle 2 to in-house equipment 1 (Step S4) and performs the normal transmission process through PLC (Step S5).

On the other hand, in a case where the charging process is not currently in the middle of the process in Step S25 (No in Step S25), a PLC communication connection between vehicle 2 and in-house equipment 1 has not been established. Accordingly, vehicle-side PLC communication control section 26 performs a transmission-start determining process (Step S6). Here, the transmission-start determining process is a process of determining a condition (form) on which the vehicle information of vehicle 2 is transmitted to in-house equipment 1 so as to establish a PLC communication connection by turning on leakage breaker relay 31 of earth leakage circuit-breaker 3 only when the vehicle information is transmitted. In addition, the transmission-start determining is a process to determine a transmission start time point based on the condition (form) of the vehicle information (data). Examples of this process include: a process in which vehicle information is transmitted when the capacity of the transmission buffer of the vehicle information stored in storage section 27 of in-vehicle charging apparatus 21 is full; a process in which vehicle information having a high priority level is transmitted; and a process in which vehicle information having a large evaluation value determined by priority level×data size is transmitted. The transmission-start determining process will be described later in detail.

Referring back to FIG. 5, when the transmission-start determining process for the vehicle information is performed in Step S6, vehicle-side PLC communication control section 26 requests charging control section 25b of charger 25 to perform PLC communication control using charger 25 by turning on leakage breaker relay 31 of earth leakage circuit-breaker 3 illustrated in FIG. 2 (Step S7). Then, charging control section 25b receives the request for turning on leakage breaker relay 31 (Step S8) and performs the request for turning on leakage breaker relay 31 by transmitting turning-on information of leakage breaker relay 31 to earth leakage circuit-breaker 3 as a control signal Sg through the control signal line (Step S9)

In the manner described above, vehicle-side PLC communication control section 26 determines whether a PLC communication connection has been established (Step S10). Then, in a case where a PLC communication connection has not been established (No in Step S10), vehicle-side PLC communication control section 26 determines that there is an abnormality in a certain portion of charging cable 4 and determines that transmission is impossible (Step S11). On the other hand, in a case where a PLC communication connection has been established in Step S10 (Yes in Step S10), vehicle-side PLC communication control section 26 starts transmitting the vehicle information (data) of vehicle 2 to in-house equipment 1 (Step S12), and the process proceeds to a sequence of turning off leakage breaker relay 31 (Step B) to be described later, upon completion of the transmission of the vehicle information (data) (Step S13).

Embodiment 3

Next, several patterns of the transmission-start determining process for the vehicle information in Step S6 illustrated in FIGS. 4 and 5 will be described in detail as Embodiment 3 of the present invention. In other words, determination criteria for starting the transmission of the vehicle information include following three determination reference patterns (1) to (3).

(1) The vehicle information is transmitted when the capacity of the transmission memory buffer of the vehicle information stored in storage section 27 of in-vehicle charging apparatus 21 is full.
(2) The vehicle information is transmitted when vehicle information having a high priority level is detected.
(3) The vehicle information is transmitted when an evaluation value which is determined based on priority level×data size (size of the vehicle information) exceeds a predetermined value. The vehicle information stored in storage section 27 is transmitted altogether based on any determination reference pattern of these three determination reference patterns.

Figure 6:
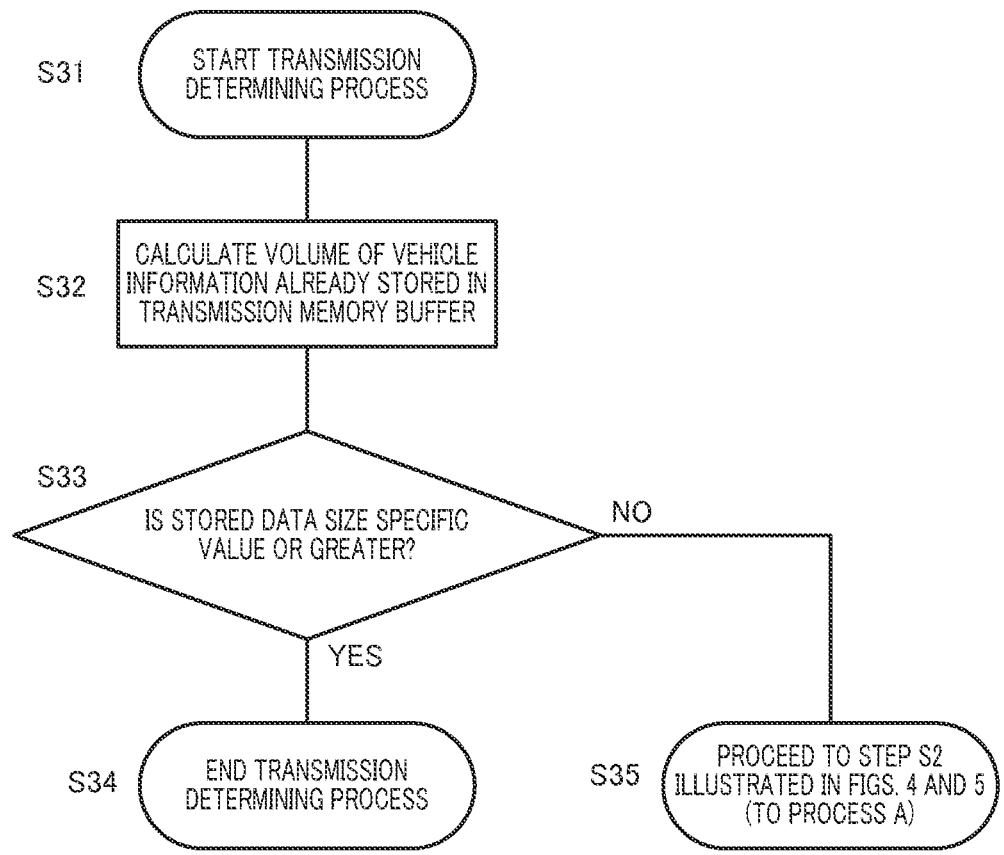
FIG. 6 is a flowchart illustrating the flow of Pattern 1 of a transmission-start determining process in Step S6 illustrated in FIG. 4 or 5 according to Embodiment 3 of the present invention.

FIG. 6 is a flowchart illustrating the flow of Pattern 1 of the transmission-start determining process in Step S6 illustrated in FIG. 4 or 5 according to Embodiment 3 of the present invention. Here, the transmission-start determining process of Pattern 1 is a determination process for starting transmission using PLC when the capacity of the transmission memory buffer of the vehicle information stored in storage section 27 is full.

As illustrated in FIG. 6, first, when the transmission determining process for the vehicle information is started (Step S31), vehicle-side PLC communication control section 26 of in-vehicle charging apparatus 21 calculates the volume of the vehicle information, which has been stored in storage section 27, in the transmission memory buffer (Step S32). Then, vehicle-side PLC communication control section 26 determines whether or not the data size of the vehicle information, which has been stored, in the transmission memory buffer is a predetermined value or greater (Step S33). Here, when the data size of data stored in the transmission memory buffer is the predetermined value or greater (Yes in Step S33), vehicle-side PLC communication control section 26 ends the transmission determining process for the vehicle information (Step S34), establishes PLC at a time point when the data size of the vehicle information stored in the transmission memory buffer is just the predetermined value or greater, and transmits data altogether.

On the other hand, when the data size in the transmission memory buffer of the vehicle information that is stored in storage section 27 is not the predetermined value or greater in Step S33 (No in Step S33), the process is returned to Step S2 illustrated in FIGS. 4 and 5 (Step S35), and the detection of the volume of the vehicle information, which is stored in storage section 27, in the transmission memory buffer is continued.

In other words, the flow of the transmission determining process for the vehicle information illustrated in Steps S31 to S34 described above represents the following. When no charging is performed, in other words, when leakage breaker relay 31 of earth leakage circuit-breaker 3 is blocked, and PLC is not established, leakage breaker relay 31 of earth leakage circuit-breaker 3 is turned on when the volume of the vehicle information is a predetermined amount or greater, a communication connection according to PLC is temporarily established, and data is transmitted to house-side PLC terminal 12 of in-house equipment 1 altogether. Then, after the data is instantly transmitted altogether, immediately, leakage breaker relay 31 of earth leakage circuit-breaker 3 is turned off so as to cause the vehicle-side connection terminal of charging cable 4 to be in the non-voltage state, whereby electrical safety is ensured. In addition, the vehicle information transmitted from in-vehicle charging apparatus 21 at the moment can be monitored using the screen of television set 14 or PC 15 of in-house equipment 1.

Figure 7:
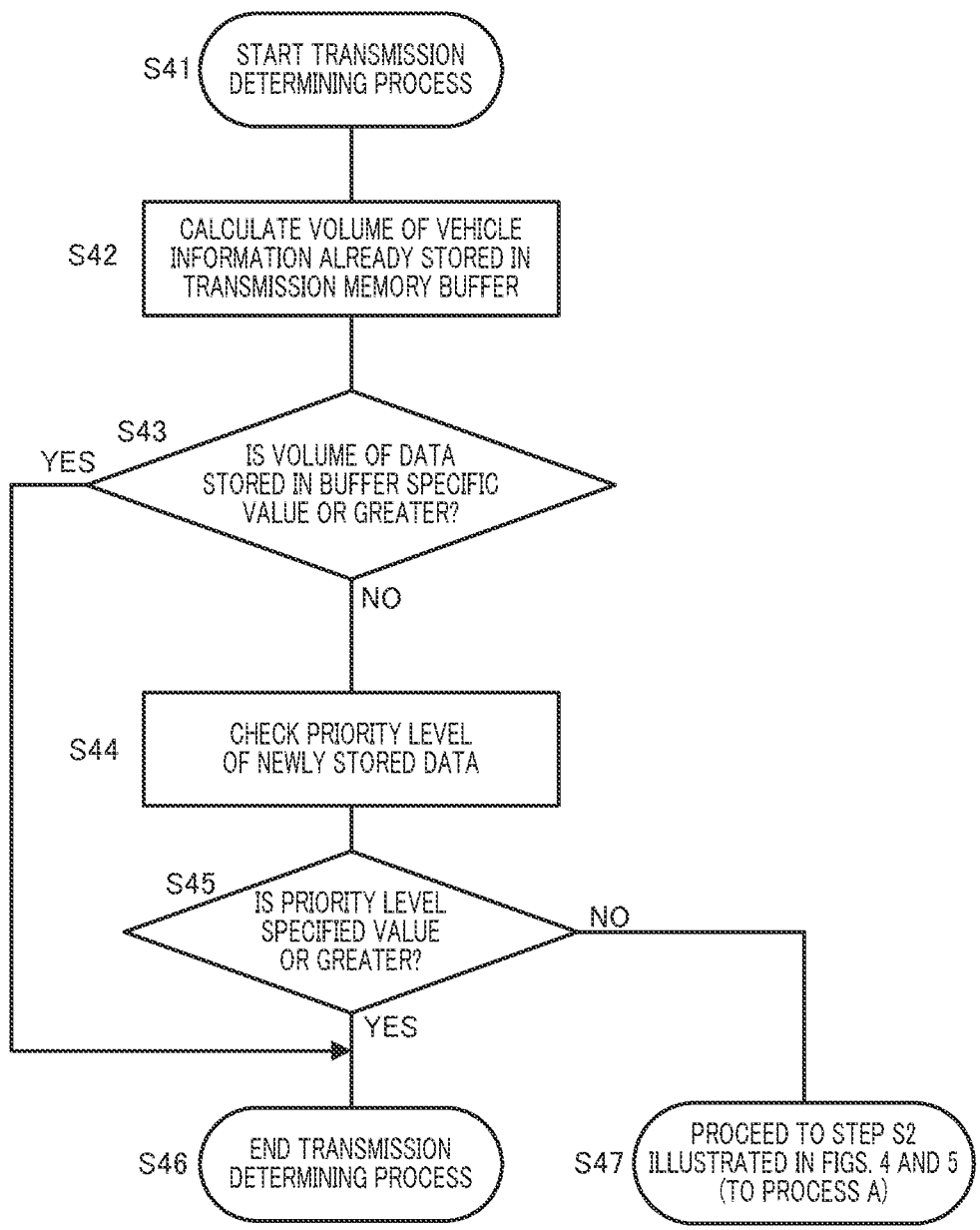
FIG. 7 is a flowchart illustrating the flow of Pattern 2 of the transmission-start determining process in Step S6 illustrated in FIG. 4 or 5 according to Embodiment 3 of the present invention.

FIG. 7 is a flowchart illustrating the flow of Pattern 2 of the transmission-start determining process in Step S6 illustrated in FIG. 4 or 5 according to Embodiment 3 of the present invention. The transmission-start determining process of Pattern 2 is a determination process for assigning priority levels to vehicle information in advance and transmitting vehicle information having a high priority level using PLC.

As illustrated in FIG. 7, first, when the transmission determining process for the vehicle information is started (Step S41), vehicle-side PLC communication control section 26 of in-vehicle charging apparatus 21 calculates the volume of the vehicle information, which has been stored in storage section 27, in the transmission memory buffer (Step S42). Then, vehicle-side PLC communication control section 26 determines whether or not the data size of the vehicle information, which has been stored, in the transmission memory buffer is a predetermined value or greater (Step S43). Here, when the data size of data stored in the transmission memory buffer is the predetermined value or greater (Yes in Step S43), the transmission determining process ends (Step S46). On the other hand, when the data size of data stored in the transmission memory buffer is not the predetermined value or greater (No in Step S43), the priority level of newly stored data at the time of storing new vehicle information in storage section 27 is checked (Step S44).

In other words, in Step S44, as illustrated in FIG. 9, the priority level of newly stored data of vehicle information is checked based on Table A in which a priority level, a priority level coefficient, a data size example, and an evaluation value for each category of the vehicle information are compared with each other. For example, "breakdown detection information" and the like of the vehicle information have the highest priority level of "5," and "running history" that is vehicle information regularly transmitted to a server and the like have the lowest priority level of "1." Here, Table A illustrated in FIG. 9 represents a table of a case where a command and vehicle information have one-to-one correspondence.

As above, in Step S44, the priority level of newly stored data of vehicle information is checked based on Table A illustrated in FIG. 9, and whether or not there is vehicle information having a priority level of a specified value or greater (for example, a priority level of "4" or greater) is determined (Step S45). Here, when vehicle information having a priority level of a specified value or greater (for example, a priority level of "4" or greater) is detected (Yes in Step S45), the transmission determining process ends (Step S46), PLC is established, and the vehicle information stored in the transmission memory buffer is transmitted altogether. Alternatively, when vehicle information having a priority level of a specified value or greater (for example, a priority level of "4" or greater) is detected, PLC may be established, and only vehicle information having a priority level of a specified value or greater (for example, a priority level of "4" or greater) may be transmitted. For example, based on Table A illustrated in FIG. 9, it is determined that there are breakdown detection information, battery leakage detection information, user-initiated communication request information, sensor camera screen (urgent), vehicle indoor temperature abnormality information, and charging rate reduction information as vehicle information having a priority level of "4" or greater, and only the vehicle information having a priority level of "4" or greater is immediately transmitted.

On the other hand, when there is no vehicle information having a priority level of the specified value or greater (for example, a priority level of "4" or greater) in Step S45 (No in Step S45), the process is returned to Step S2 illustrated in FIGS. 4 and 5 (Step S47), and the detection of the volume of the vehicle information, which is stored in storage section 27, in the transmission memory buffer is continued.

In other words, the flow of the transmission determining process for vehicle information illustrated in Steps S41 to S46 described above represents the following. When no charging is performed, that is, when PLC is not established due to blocking of leakage breaker relay 31 of earth leakage circuit-breaker 3, leakage breaker relay 31 of earth leakage circuit-breaker 3 is turned on only when there is vehicle information having a priority level of a specified value or greater, a communication connection through PLC is temporarily established, and only data of the vehicle information having a priority level of the specified value or greater is transmitted to house-side PLC terminal 12 of in-house equipment 1 altogether. Then, after data having high priority levels is instantly transmitted altogether, immediately, leakage breaker relay 31 of earth leakage circuit-breaker 3 is turned off so as to cause the vehicle-side connection terminal of charging cable 4 to be in a non-voltage state, whereby electrical safety is ensured. In addition, the vehicle information having high priority levels, which has been transmitted at that time, can be monitored using the screen of television set 14 or PC 15 of in-house equipment 1.

Figure 8:
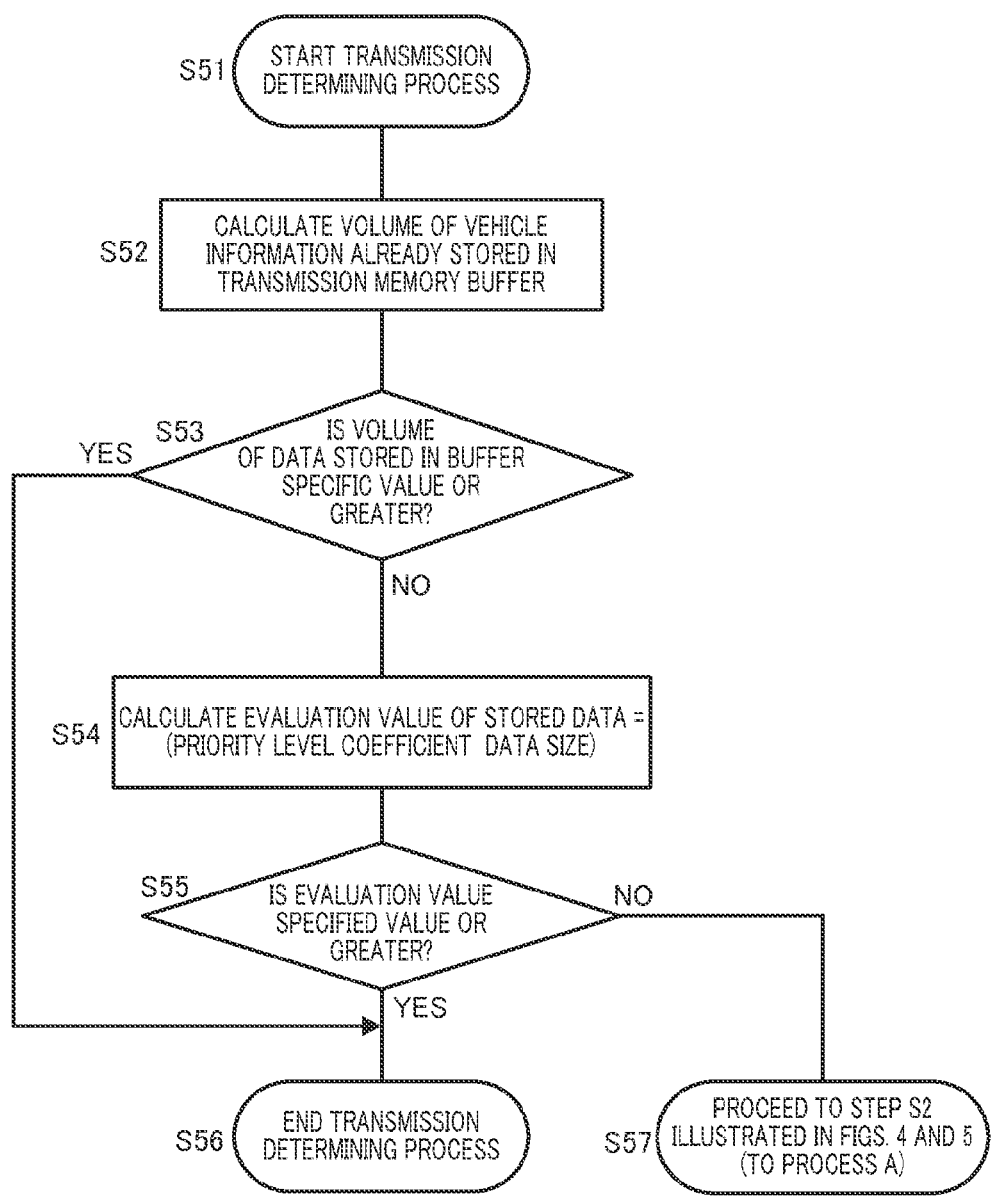
FIG. 8 is a flowchart illustrating the flow of Pattern 3 of the transmission-start determining process in Step S6 illustrated in FIG. 4 or 5 according to Embodiment 3 of the present invention.

FIG. 8 is a flowchart illustrating the flow of Pattern 3 of the transmission-start determining process in Step S6 illustrated in FIG. 4 or 5 according to Embodiment 3 of the present invention. Here, the transmission-start determining process of Pattern 3 is a determination process for assigning a priority level coefficient to vehicle information in advance and transmitting vehicle information having an evaluation value, which is determined based on "priority level coefficient×data size," of a specified value or greater through PLC.

As illustrated in FIG. 8, first, when the transmission determining process for vehicle information is started (Step S51), vehicle-side PLC communication control section 26 of in-vehicle charging apparatus 21 calculates the volume of the vehicle information, which has been stored in storage section 27, in the transmission memory buffer (Step S52). Then, vehicle-side PLC communication control section 26 determines whether or not the data size of the vehicle information, which has been stored in storage section 27, in the transmission memory buffer is a predetermined value or greater (Step S53). Here, when the data size of data stored in the transmission memory buffer is the predetermined value or greater (Yes in Step S53), the transmission determining process ends (Step S56). On the other hand, when the data size of data stored in the transmission memory buffer is not the predetermined value or greater (No in Step S53), an evaluation value (=priority level coefficient×data size) of the vehicle information that has been stored in storage section 27 is calculated (Step S54).

FIG. 9 is a diagram illustrating Table A in which a priority level, a priority coefficient, a data size example, and an evaluation value for vehicle information are compared with each other. In other words, in Step S54 described above, as represented in Table A illustrated in FIG. 9, an evaluation value is calculated for each type (category) of vehicle information by multiplying a priority level coefficient and a data size together that are determined for each type (category) of the vehicle information. For example, as represented in Table A, when the vehicle information is sensor camera information (urgent), the priority level coefficient is 100, and the data size is 40,000 bytes, and accordingly, the evaluation value is calculated as 4,000,000.

Referring back to FIG. 8, whether or not the evaluation value of the vehicle information calculated in Step S54 as above is a specified value or greater is determined (Step S55). When the evaluation value of the vehicle information is the specified value or greater (Yes in Step S55), the transmission determining process ends (Step S56), PLC is established, and only the vehicle information having an evaluation value of the specified value or greater is transmitted. For example, based on Table A illustrated in FIG. 9, it is determined that a sensor camera image (urgent) having an evaluation value 4,000,000 of the vehicle information, which is a specified value or greater, is present, the transmission determining process ends, and the vehicle information stored in storage section 27 is transmitted altogether using PLC. Alternatively, only the vehicle information of which the evaluation value is a specified value or greater may be configured to be transmitted.

On the other hand, when there is no vehicle information of which the evaluation value is the specified value or greater in Step S55 (No in Step S55), the process is returned to Step S2 illustrated in FIGS. 4 and 5 (Step S57), and the detection of the volume of the vehicle information, which is stored in storage section 27, in the transmission memory buffer is continued.

In other words, the flow of the transmission determining process for vehicle information illustrated in Steps S51 to S56 described above represents the following. When no charging is performed, in other words, when leakage breaker relay 31 of earth leakage circuit-breaker 3 is blocked and PLC is not established, leakage breaker relay 31 of earth leakage circuit-breaker 3 is turned on only when vehicle information of which the evaluation value is a specified value or greater is present, a communication connection through PLC is temporarily established, and only data of the vehicle information of which the evaluation value is the specified value or greater is transmitted to house-side PLC terminal 12 of in-house equipment 1 altogether.

Then, immediately after the data having a high evaluation value is instantly transmitted altogether, leakage breaker relay 31 of earth leakage circuit-breaker 3 is turned off so as to cause the vehicle-side connection terminal of charging cable 4 to be in the non-voltage state, whereby electrical safety is ensured. In addition, the vehicle information having a high evaluation value transmitted at that time can be monitored using the screen of television set 14 or PC 15 of in-house equipment 1. For example, when a suspicious person comes close to a vehicle parked in a garage at night, a sensor camera image (urgent) is immediately projected onto the screen of television set 14 or PC 15. Thus, the image can be used for preventing vehicle theft or the like.

As described above, the transmission determination criterion for vehicle information at a time when charging is stopped is determined as below.

(1) When the volume of the vehicle information in the memory buffer exceeds a predetermined value, PLC is established, and the vehicle information is transmitted altogether.

(2) When vehicle information having a high priority level (for example, vehicle information having a priority level of 4 or greater in Table A illustrated in FIG. 9) is present, PLC is established, and the vehicle information is transmitted, immediately.

(3) When vehicle information of which the evaluation value (=priority level coefficient×data size) is a predetermined value or greater (for example, vehicle information of which the evaluation value is 16,000 or greater in Table A illustrated in FIG. 9) is present, PLC is established, and the vehicle information is transmitted, immediately.

The advantage of using the evaluation value of vehicle information as a transmission determination criterion is as follows. For example, "sensor vibration detection information" of the vehicle information represented in Table A illustrated in FIG. 9 has a priority level of "3" and a data size of 16 bytes. Accordingly, in a case where the condition of the transmission determination criterion is a priority level of "5" or a volume of the vehicle information of 256 Kbytes in the memory buffer, the transmission criterion is not satisfied unless data (16 bytes) of "sensor vibration detection information" is detected 16,000 times or more. Accordingly, the transmission criterion of the vehicle information is not reached unless a considerable number of vibrations are detected. Therefore, for example, even when a vehicle is parked on an unpaved rough road for charging, and a vibration is detected from a large-size car passing by the side thereof or the like, there is no concern that the "sensor vibration detection information" is frequently transmitted.

However, for example, when the security level is raised as an anticrime measure for a high-priced vehicle, the threshold of the evaluation value of the vehicle information is set to 1,500. Thus, as represented in Table A illustrated in FIG. 9, the evaluation value of the "sensor vibration detection information" of the vehicle information is 1,600, and accordingly, the "sensor vibration detection information" of a first time satisfies the condition of the transmission determination criterion. Accordingly, since the evaluation value of the vehicle information is the predetermined value or greater, PLC is established, and the vehicle information of the "sensor vibration detection information" can be transmitted, immediately.

In addition, when the vehicle indoor temperature rises during summertime, for example, "indoor temperature abnormality information" of the vehicle information represented in Table A illustrated in FIG. 9 is a phenomenon which may occur on a daily basis, and accordingly, the priority level coefficient is set to be low (a priority level coefficient of 10), and the evaluation value of the vehicle information is suppressed to be low as 160. Thus, an advantage of lowering the transmission frequency of the vehicle information of the "indoor temperature abnormality" can be expected.

FIG. 10 is a diagram illustrating Table B in which a command for each type and a content of each type of vehicle information are compared with each other. As the content of each type of the vehicle information, there are urgent information, maintenance information, warning information, user information, and regular transmission information. For example, the urgent information is information acquired by grouping related information such as vibration detection information of the vehicle, electric leakage detection information, and sensor camera image (urgent) information.

In other words, a transmission determination may be performed based on the content of each type of the grouped vehicle information as Pattern 4 of the transmission determination criterion of vehicle information, as represented in Table B illustrated in FIG. 10, other than the transmission determination criterion of vehicle information from the three patterns described above. The criterion of the transmission determination in this case is as follows.

(1) The priority of transmission is determined based on the command for each type. For example, when the command for each type is "01" in Table B, corresponding vehicle information is transmitted, immediately.

(2) The transmission timing is determined in accordance with the status at the time, as in a case in which the vehicle information is transmitted after 10 minutes when the command for each type is "02" or "03," the vehicle information is immediately transmitted when the command for each type is "04," and the vehicle information is transmitted after one hour when the command for each type is "05."

Embodiment 4

Figure 11:
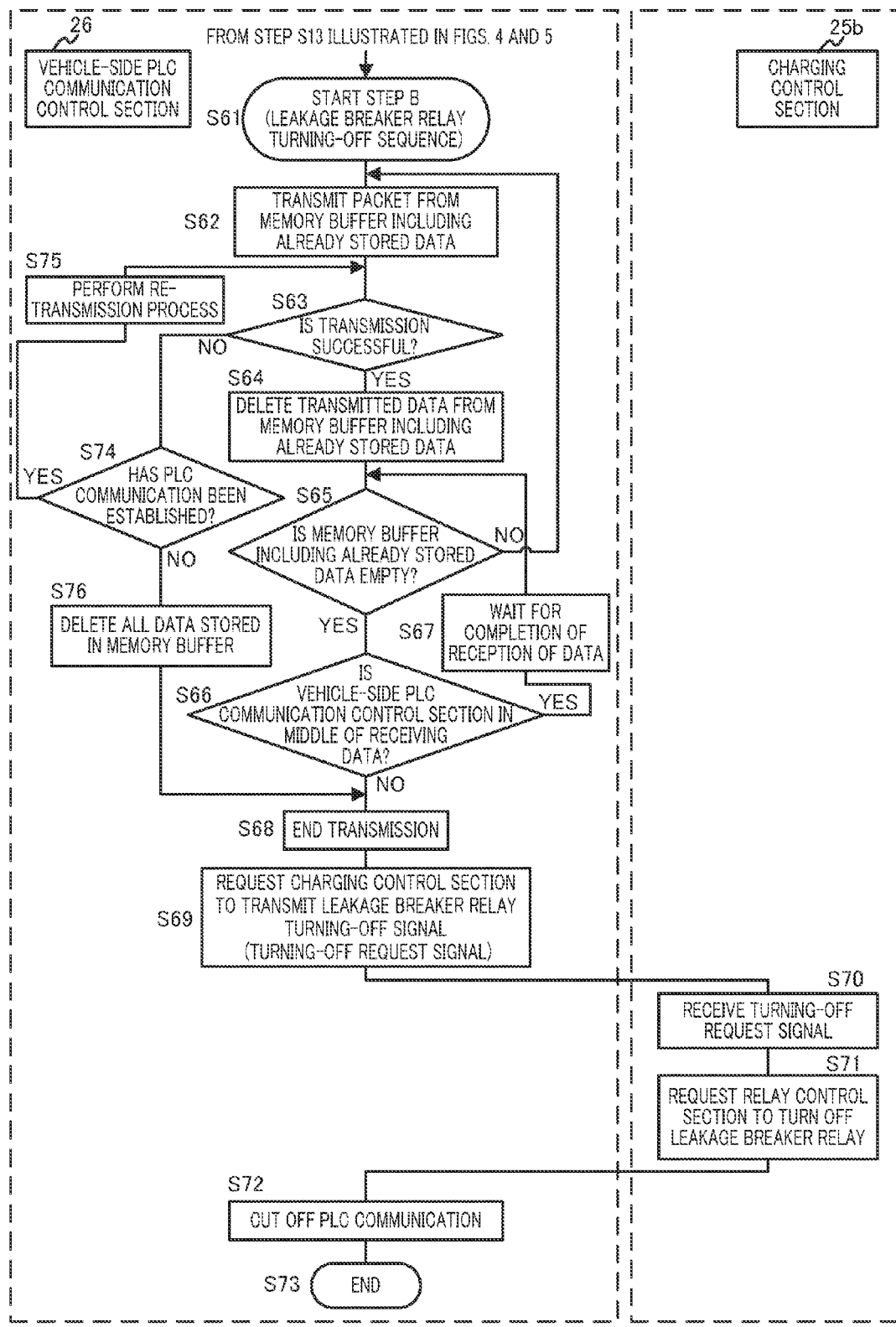
FIG. 11 is a flowchart illustrating the flow of the process of ending PLC by switching a leakage breaker relay to an Off sequence using a vehicle-side PLC communication control section in Embodiment 4 of the present invention.

Next, as Embodiment 4, after vehicle information is started to be transmitted to the in-house equipment 1 in Step S12 illustrated in FIGS. 4 and 5, and upon completion of transmission of a predetermined volume of vehicle information, the process of Step B at the time of transitioning to the sequence of turning off leakage breaker relay 31 in Step S13 will be described. FIG. 11 is a flowchart illustrating the flow of the process of ending PLC by switching leakage breaker relay 31 to an Off sequence using vehicle-side PLC communication control section 26 in Embodiment 4 of the present invention.

As illustrated in FIG. 11, first, following Step S13 illustrated in FIGS. 4 and 5, when the turning-off sequence of leakage breaker relay 31 is started (Step S61), a packet is transmitted from the memory buffer including already stored data in storage section 27 (Step S62), and it is determined whether the transmission of the packet is successful (Step S63). Here, in a case where the transmission of the packet is successful (Yes in Step S63), data that has been transmitted is removed from the memory buffer in which the data has been stored, so as to increase a free space of storage section 27 (Step S64).

Accordingly, vehicle-side PLC communication control section 26 determines whether or not the memory buffer including already stored data in storage section 27 has been emptied (Step S65). Here, in a case where the memory buffer including already stored data in storage section 27 has been emptied (Yes in Step S65), vehicle-side PLC communication control section 26 determines whether or not data is currently received (Step S66). In a case where data is currently received (Yes in Step S66), vehicle-side PLC communication control section 26 repeats the process of Step S65 for determining whether or not the memory buffer including already stored data has been emptied and the process of Step S66 for determining whether or not data is currently received and waits for the completion of the reception of data (Step S67).

On the other hand, when data is not currently received in Step S66 (No in Step S66), vehicle-side PLC communication control section 26 completes the transmission process for data (Step S68) and requests charging control section 25*b* to transmit a control signal Sg for turning off leakage breaker relay 31 (Step S69).

Then, charging control section 25*b* receives the turning-off request signal for leakage breaker relay 31 (Step S70) and requests relay control section 33 of earth leakage circuit-breaker 3 to turn off leakage breaker relay 31 (Step S71). Accordingly, leakage breaker relay 31 is turned off, and the PLC communication connection is cut off (Step S72), and the turning-off sequence of leakage breaker relay 31 ends (Step S73).

On the other hand, when the transmission of the packet is not successful in Step S63 (No in Step S63), whether or not a PLC communication connection has been established is determined (Step S74). In a case where the PLC communication connection has been established (Yes in Step S74), a process of retransmitting the packet is performed (Step S75), and the process of determining whether or not the transmission of a packet is successful in Step S63 described above is repeated. On the other hand, in a case where a PLC communication connection has not been established in Step S74 (No in Step S74), all the data of the memory buffer of storage section 27 is deleted (Step S76) so as to empty the memory buffer for storing new updated information, and the process proceeds to a transmission completing step of Step S68.

Comparative Example

Figure 12:
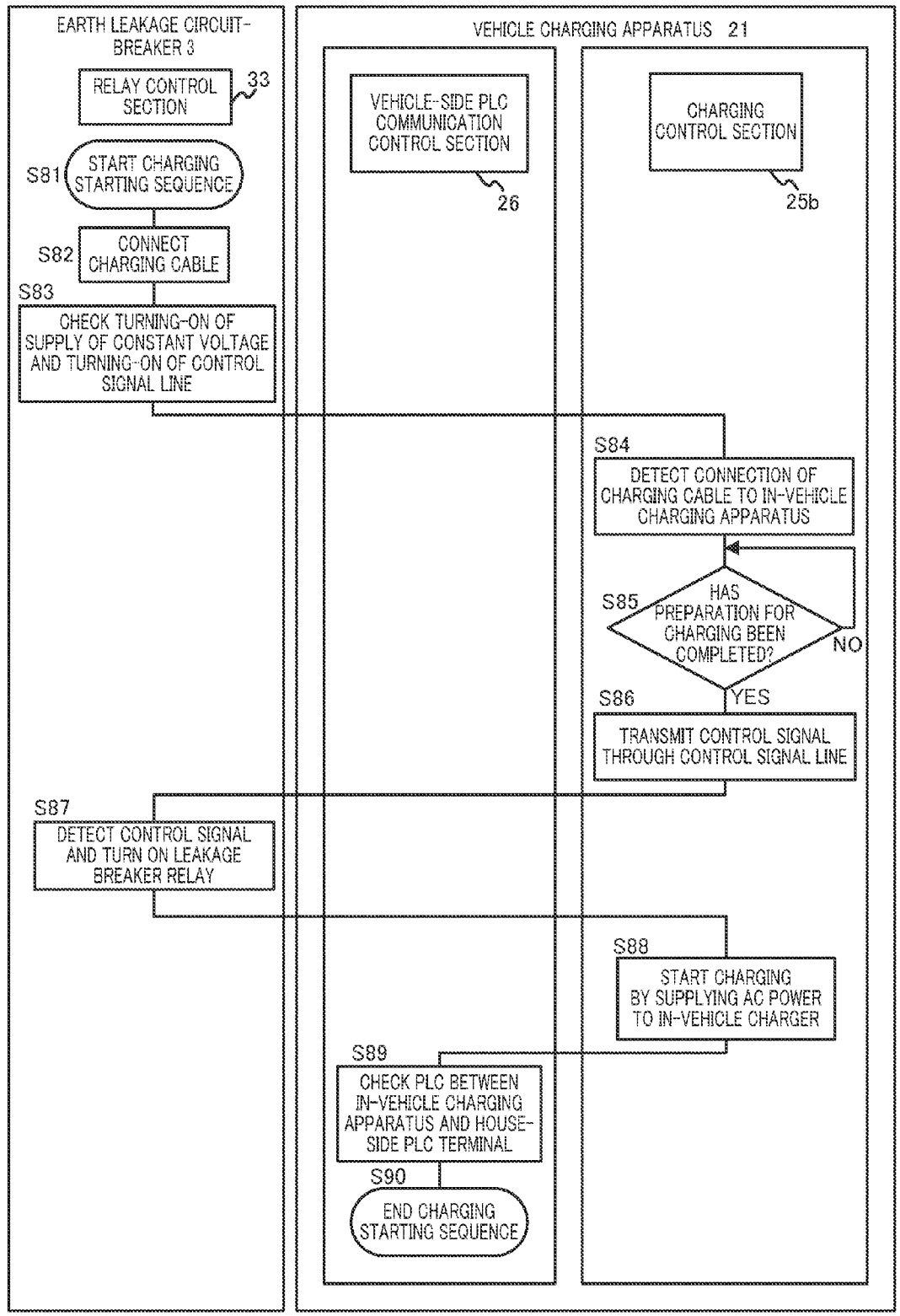
FIG. 12 is a flowchart illustrating the flow of a PLC connection at the time of starting charging that is generally performed.

Next, as a comparative example for reference, a description will be given of a PLC communication connection at the time of charging, which is generally performed. FIG. 12 is a flowchart illustrating the flow of a PLC connection at the time of starting charging, which is generally performed. As illustrated in FIG. 12, when a charging starting sequence is started (Step S81), first, charging cable 4 is connected to in-house equipment 1 on the input side of earth leakage circuit-breaker 3 (Step S82). Then, relay control section 33 of earth leakage circuit-breaker 3 checks whether a constant voltage is supplied from in-house equipment 1 to earth leakage circuit-breaker 3 and whether the control signal line is in a conductive state (Step S83).

Meanwhile, charging control section 25*b* of in-vehicle charging apparatus 21 detects that charging cable 4 is connected to in-vehicle charging apparatus 21 side (Step S84) and determines whether or not the preparation for charging has been completed (Step S85). Here, in a case where the preparation for charging has not been completed (No in Step S85), the process waits for the completion of the preparation for charging, and, when the preparation for charging is completed (Yes in Step S85), charging control section 25*b* of in-vehicle charging apparatus 21 transmits a control signal Sg to relay control section 33 of earth leakage circuit-breaker 3 through the control signal line (Step S86).

Accordingly, relay control section 33 of earth leakage circuit-breaker 3 detects the control signal Sg and turns on leakage breaker relay 31 (Step S87). Then, charging power (AC power) is supplied from in-house equipment 1 to in-vehicle charging apparatus 21, and storage battery relay 28 is turned on by charging control section 25*b*, whereby charging of storage battery 24 is started (Step S88). Then, vehicle-side PLC communication control section 26 sets up a communication connection according to PLC between in-vehicle charging apparatus 21 and house-side PLC terminal 12 (Step S89) and ends the charging starting sequence (Step S90). Accordingly, communication according to PLC can be also performed during the charging process.

Conclusion

As described above, according to in-vehicle charging apparatus 21 of an embodiment of the present invention, when earth leakage circuit-breaker 3 is open, and charging using charging cable 4 is not performed, a communication connection according to PLC is established only for a minimum required time in accordance with any one of the following three patterns, and only necessary vehicle information is transmitted to in-house equipment 1. In addition, immediately after the transmission of the vehicle information is completed, the PLC communication connection is blocked, whereby electrical safety of the vehicle-side connection terminal is ensured.

In other words, during the stop of charging, the following operations are performed.
(1) The vehicle information desired to be communicated in accordance with PLC is stored (buffered) in the storage section 27, and when the amount of the stored data exceeds a predetermined value, the vehicle information is transmitted together in accordance with PLC.
(2) A priority level is set for each type of data of the vehicle information, and when vehicle information having a priority level higher than a priority level that is specified in advance is present, stored data is transmitted together in accordance with PLC.

(3) An evaluation value (=priority level coefficient×data size) is set for each type of data of the vehicle information, and when there is data of the vehicle information of which the evaluation value is higher than an evaluation level that is specified in advance, stored data is transmitted altogether in accordance with PLC.

Then, upon detection of the completion of data transmission of desired vehicle information, immediately, leakage breaker relay 31 of earth leakage circuit-breaker 3 is turned off so as to block the PLC communication connection (communication line). Accordingly, when charging is not performed, leakage breaker relay 31 of earth leakage circuit-breaker 3 is turned on only for a requisite minimum time so as to establish a PLC communication line, and stored data can be transmitted altogether. In addition, since the non-voltage state of the vehicle-side connection terminal of charging cable 4 can be maintained as long as possible, the electrical safety can be maintained at a relatively high level.

In other words, vehicle-side PLC communication control section 26 constantly inquires charging control section 25b whether it is in the middle of a charging process. In a case where it is in the middle of the charging process, communication according to ordinary PLC is started, and the vehicle information is transmitted. On the other hand, in a case where it is not in the middle of the charging process, a process of transmitting the vehicle information altogether is performed at any one of timing when the data size of the vehicle information is a predetermined data size or greater, timing when vehicle information having a high priority level is present, and timing when there is vehicle information of which the evaluation value is high. In addition, when detecting whether or not charging is currently performed, vehicle-side PLC communication control section 26 does not need to determine again whether a communication line according to PLC is established.

After the transmission of the vehicle information is completed, by deleting the vehicle information that has been completed to be transmitted from storage section 27, the capacity of storage section 27 can be maximally used in an effective manner. In addition, when the transmission of the vehicle information cannot be completed and when a communication line according to PLC is not established, vehicle information having a priority level lower than a predetermined priority level is deleted. Accordingly, even when the transmission of the vehicle information is not completed, in a case where a communication line according to PLC cannot be established, an empty area of storage section 27 can be effectively secured by deleting vehicle information having a low priority level.

In addition, when information representing the occurrence of an electric leakage is received from earth leakage circuit-breaker 3, vehicle-side PLC communication control section 26 does not issue an instruction for turning on leakage breaker relay 31 to charging control section 25b. In other words, when leakage breaker relay 31 is turned off due to the occurrence of an electric leakage in charging cable (power line) 4, a malfunction for turning on leakage breaker relay 31 at least one moment by transmitting a control signal Sg used for turning on leakage breaker relay 31 can be prevented.

As above, while several embodiments of the present invention have been specifically described, the present invention is not limited to each embodiment described above, but various changes can be made therein within a range not departing from the concept thereof. For example, the conditions for setting up a communication line according to PLC during the stop of charging are not limited to the conditions of three patterns described above, but may be changed to conditions desired by a user. In addition, in each embodiment described above, while the in-vehicle charging apparatus, which can be charged from the outside, installed in an EV or a HEV has been described, the present invention is not limited thereto, and it is apparent that the present invention can be applied to an in-vehicle charging apparatus used for charging a storage battery installed in an ordinary gasoline-powered vehicle.

The disclosure of Japanese Patent Application No. 2011-072050, filed on Mar. 29, 2011, including the specification, drawings and abstract, is incorporated herein by reference in its entirety.

INDUSTRIAL APPLICABILITY

The present invention can be not only used as an in-vehicle charging apparatus of an HEV or an EV but also can be used effectively as an in-vehicle charging apparatus of a general vehicle such as a gasoline-powered vehicle.

REFERENCE SIGNS LIST

1 In-house equipment
2 Vehicle
3 Earth leakage circuit-breaker
4 Charging cable (Power line)
5 Plug/Outlet
10 House
11 Panel Board
12 House-side PLC terminal
13 Internet modem
14 Television Set
15 Personal computer
21 In-vehicle charging apparatus
22 Camera
23 Air conditioner
24 Storage battery
25 Charger
25a Charger power supply circuit
25b Charging control section
26 Vehicle-side PLC communication control section
27 Storage section
28 Storage battery relay
31 Leakage breaker relay
32 Electric leakage detecting section
33 Relay control section

The invention claimed is:

1. An in-vehicle charging apparatus that charges a storage battery installed in a vehicle from a power supply provided outside the vehicle through a power line extending via an earth leakage circuit-breaker, the apparatus comprising:
   a storage section that stores vehicle information relating to the vehicle; and
   a vehicle-side PLC (Power Line Communications) communication control section that outputs a control signal for closing the earth leakage circuit-breaker, then establish a PLC communication line using the power line as a communication line, and transmits the vehicle information stored in the storage section to the outside of the vehicle, when determining that the vehicle information stored in the storage section needs to be transmitted to the outside of the vehicle.

2. The in-vehicle charging apparatus according to claim 1, wherein the vehicle-side PLC communication control section outputs a control signal for closing the earth leakage circuit-breaker when the storage battery installed in the vehicle is not charged from the power supply provided outside the vehicle.

3. The in-vehicle charging apparatus according to claim 1, wherein, when the vehicle information of a predetermined data size or greater is stored in the storage section, the vehicle-side PLC communication control section determines that the vehicle information needs to be transmitted to the outside of the vehicle, and the vehicle-side PLC communication control section then establishes a PLC communication line, and then transmits, to the outside of the vehicle, all the vehicle information which is stored in the storage section and which is transmittable.

4. The in-vehicle charging apparatus according to claim 1, wherein:
a priority level is set, for each category, to the vehicle information stored in the storage section; and
the vehicle-side PLC communication control section determines that the vehicle information needs to be transmitted to the outside of the vehicle when the vehicle information having a priority level higher than a predetermined level is stored in the storage section, and the vehicle-side PLC communication control section then establishes a PLC communication line and then transmits, to the outside of the vehicle, all the vehicle information which is stored in the storage section and which is transmittable.

5. The in-vehicle charging apparatus according to claim 1, wherein:
a priority level is set, for each category, to the vehicle information stored in the storage section; and
the vehicle-side PLC communication control section determines that the vehicle information needs to be transmitted to the outside of the vehicle when the vehicle information having a priority level higher than a predetermined level is stored in the storage section, and the vehicle-side PLC communication control section then establishes a PLC communication line and then transmits, to the outside of the vehicle, the vehicle information which is stored in the storage section and which has the priority level higher than a predetermined level.

6. The in-vehicle charging apparatus according to claim 1, wherein:
an evaluation value acquired by multiplying a priority level coefficient and a data size is set to each category of the vehicle information stored in the storage section; and
the vehicle-side PLC communication control section determines that the vehicle information needs to be transmitted to the outside of the vehicle when the vehicle information having an evaluation value higher than a predetermined value is stored in the storage section, and the vehicle-side PLC communication control section then establishes a PLC communication line and then transmits, to the outside of the vehicle, all the vehicle information which is stored in the storage section and which is transmittable.

7. The in-vehicle charging apparatus according to claim 1, wherein:
an evaluation value acquired by multiplying a priority level coefficient and a data size is set to each category of the vehicle information stored in the storage section; and
the vehicle-side PLC communication control section determines that the vehicle information needs to be transmitted to the outside of the vehicle when the vehicle information having an evaluation value higher than a predetermined value is stored in the storage section, and the vehicle-side PLC communication control section establishes a PLC communication line, and then transmits, to the outside of the vehicle, the vehicle information which is stored in the storage section and which has the evaluation value higher than the predetermined value.

8. The in-vehicle charging apparatus according to claim 1, wherein the vehicle-side PLC communication control section determines whether or not the vehicle information stored in the storage section needs to be transmitted to the outside of the vehicle, upon reception of information representing that the earth leakage circuit-breaker blocks the power line.

9. The in-vehicle charging apparatus according to claim 1, wherein the vehicle information is at least one of breakdown detection information, battery leakage detection information, an urgent sensor camera image, vehicle indoor temperature abnormality information, charging rate reduction information, sensor vibration detection information, maintenance information, a regular sensor camera image, and running history information of the vehicle, the running history information being regularly transmitted to a server.

10. The in-vehicle charging apparatus according to claim 9, wherein the vehicle-side PLC communication control section determines that the vehicle information stored in the storage section needs to be transmitted to the outside of the vehicle when the breakdown detection information, the battery leakage detection information, the urgent sensor camera image, the vehicle indoor temperature abnormality information, or the charging rate reduction information is stored in the storage section.

11. The in-vehicle charging apparatus according to claim 1, wherein the vehicle-side PLC communication control section deletes the vehicle information which has been transmitted from the storage section, after the transmission of the vehicle information.

12. The in-vehicle charging apparatus according to claim 4, wherein the vehicle-side PLC communication control section deletes the vehicle information having a priority level lower than a predetermined priority level from the storage section when transmission of the vehicle information cannot be completed and when a PLC communication line is not established either.

13. The in-vehicle charging apparatus according to claim 5, wherein the vehicle-side PLC communication control section deletes the vehicle information having a priority level lower than a predetermined priority level from the storage section when transmission of the vehicle information cannot be completed and when a PLC communication line is not established either.

14. The in-vehicle charging apparatus according to claim 1, wherein the vehicle-side PLC communication control section does not transmit the control signal for closing the earth leakage circuit-breaker when receiving information representing that there is an electric leakage from the earth leakage circuit-breaker.

* * * * *